United States Patent

Shiroyama et al.

[11] Patent Number: 5,847,477
[45] Date of Patent: Dec. 8, 1998

[54] LEAD-WIRE LEADING DEVICE IN ELECTRIC MOTOR

[75] Inventors: Shigeru Shiroyama; Akira Morishita, both of Tokyo, Japan

[73] Assignee: Mitsubishi Denki Kabushiki Kaisha, Tokyo, Japan

[21] Appl. No.: 882,575

[22] Filed: Jun. 25, 1997

[30] Foreign Application Priority Data

Jan. 28, 1997 [JP] Japan ................................. 9-014331

[51] Int. Cl.$^6$ ....................................................... H02K 7/00
[52] U.S. Cl. .............................. 310/71; 310/249; 310/251
[58] Field of Search ................................ 310/71, 249, 251

[56] References Cited

U.S. PATENT DOCUMENTS 4,192,352   3/1980   Hakamada et al. ...................... 138/149
4,985,654   1/1991   Morikane ................................. 310/249

*Primary Examiner*—Thomas M. Dougherty
*Assistant Examiner*—Thanh Lam
*Attorney, Agent, or Firm*—Sughrue, Mion, Zinn, Macpeak & Seas, PLLC

[57] ABSTRACT

A lead-wire leading device in an electric motor which comprises: lead wires 10a and 10b having first ends which are connected to a terminal, and second ends, namely, the remaining ends which are connected to brushes; and a grommet 7 adapted to secure the lead wires to a motor frame, namely, a rear bracket 12, the grommet 7 being fitted on the lead wires 10a and 10b, so that the leakage current circuit which is formed by the lead wires 10a and 10b, the grommet 7, and the rear bracket 17 when the motor operates abnormally is cut off with an insulating member, namely, a silicone glass tube 14 which is higher in heat resistance than the grommet 7.

6 Claims, 3 Drawing Sheets

LEAD-WIRE LEADING DEVICE IN ELECTRIC MOTOR

BACKGROUND OF THE INVENTION

This invention relates to a lead-wire leading device employed, for instance, in a starter motor, and more particularly to a lead-wire leading device in an electric motor which, when the motor operates abnormally, prevents the leakage of current thereby to prevent the expansion of a trouble with the motor.

FIGS. 4 and 5 are diagrams showing a brush holding device and a brush device which have been disclosed, for instance, U.S. Pat. No. 4,985,654. In those figures, reference numeral 1 designates a motor armature; and 2a and 2b, positive and negative brushes, respectively. Those brushes 2a and 2b are held by holding frames 3, and urged towards the commutator 1 by brush springs 4 so that their ends are in slide contact with the commutator 1. Further in FIGS. 4 and 5, reference numeral 5 designates the pig tails of the positive terminals 1a; 6, metal terminals; 7, rubber grommets fitted on lead wires 10a and 10b, and engaged with the frame of a starter motor (not shown) to keep the lead wires 10a and 10b waterproof and dust proof in a hole formed in the motor frame; and 8, lead wires of the negative brushes 2b, the lead wires 8 being connected to a metal base board 9 to which the holding frames 3 are secured.

First ends of the lead wires 10a and 10b are connected to the positive brushes 2a, and the remaining ends, namely, second ends of the lead wires 10a and 10b are connected to a common terminal 6. Further in FIG. 5, reference numeral 11 designates a fixing part provided at the middle of the lead wires 10a and 10b. The lead wires 10a and 10b are welded together by ultrasonic welding. The fixing part 11 may be employed as a positioning mark to fit the grommet 7 on the lead wires 10a and 10b.

In the above-described conventional lead-wire leading device, the first ends of the lead wires 10a and 10b are connected to the brushes 2a and 2a, while the second ends of the lead wires are connected to the terminal 6, and the grommet is fitted on the lead wires 10a and 10b, and is then engaged with the starter motor frame, namely, a rear bracket. Therefore, the lead-wire leading device suffers from the following difficulties: If, because of an erroneous operation such as the insufficient return of the key switch of a motor vehicle, the starter motor is used for a long period of time, then since the starter motor is designed to be operated for a short period of time, the starter motor generates heat, as a result of which a part of the winding may be short-circuited. If a large current flows because of this short-circuiting phenomenon, the lead wires 10a and 10b generate heat, thus carbonizing the grommet 7. As a result, the leakage of current occurs between the lead wires 10a and 10b and the rear bracket, accelerating the carbonization of the grommet 7. Finally, the grommet 7 becomes electrically conductive, so that short-circuit occurs completely between the rear bracket and the lead wires 10a and 10b; that is, the motor suffers from a so-called "dead grounding phenomenon".

SUMMARY OF THE INVENTION

Accordingly, an object of the invention is to eliminate the above-described difficulties accompanying a conventional motor's lead-wire leading device. More specifically, an object of the invention is to provide a lead-wire leading device improved in reliability which, even if a large current flows in the lead wires of a motor because of an erroneous operation of the latter, maintains the lead wires insulated from others, thereby to prevent the occurrence of short-circuit in the motor.

The foregoing object of the invention has been achieved by the provision of a lead-wire leading device in an electric motor, which, according to the invention, comprises: a lead wire having one end which is connected to a terminal, and the other end which is connected to an internal conductor in the electric motor; a grommet adapted to secure the lead wire to a motor frame; and an insulating member arranged between the lead wire and the motor frame, the insulating member being higher in heat resistance than the grommet.

In the device, the insulating member may be a silicone glass tube arranged between the lead wire and the grommet.

Furthermore, in the device, the insulating member may be an alamide paper arranged between the lead wire and the motor frame.

Moreover, in the device, the insulating member is a piece of silicone glass adhesive tape wound on the lead wire.

DETAILED DESCRIPTION OF THE PREFERRED EMBODIMENTS

Preferred embodiments of the invention will be described with reference to the accompanying drawings.

First Embodiment

Figure 1:
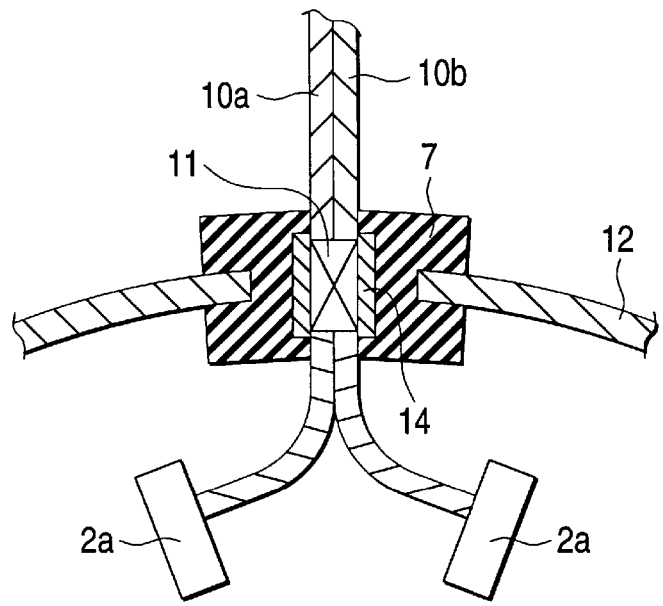
FIG. 1 is an example of a lead-wire leading device in an electric motor according to a first embodiment of the invention.
Figure 4:
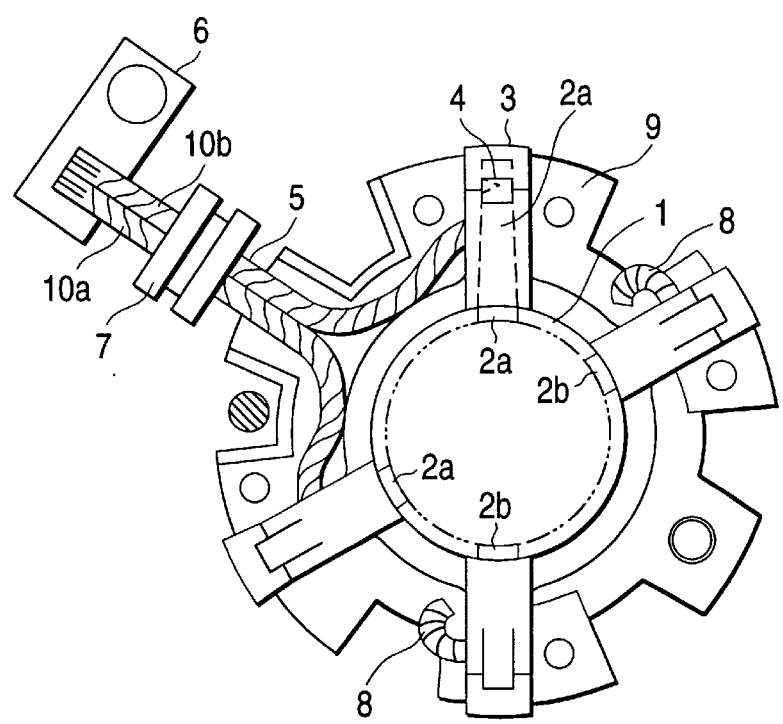
FIG. 4 is a diagram showing the arrangement of a brush holding device employing a conventional lead-wire leading device of an electric motor.
Figure 5:
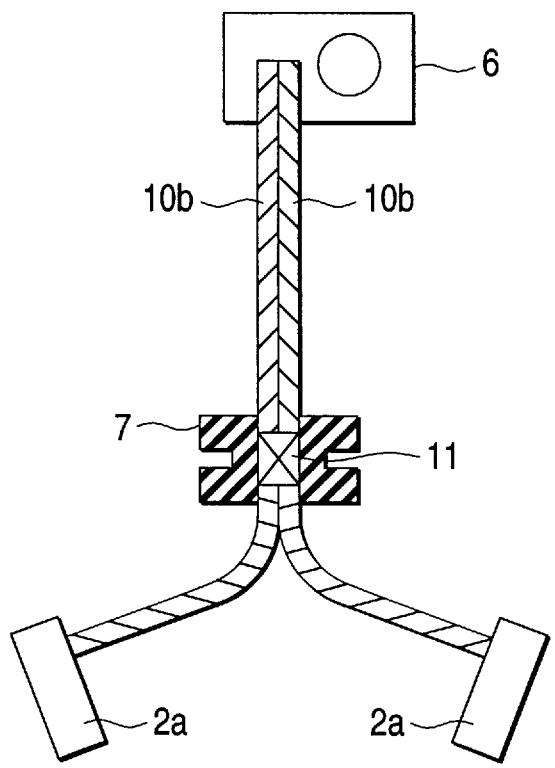
FIG. 5 is a diagram showing the structure of the conventional lead-wire leading device.

FIG. 1 is a diagram showing the arrangement of an example of a lead-wire leading device, which constitutes a first embodiment of the invention. In FIG. 1, parts corresponding functionally to those already described with reference to FIGS. 4 and 5 are therefore designated by the same reference numerals or characters.

In FIG. 1, reference numeral 14 designate a silicone glass tube which is higher in heat resistance than the rubber grommet 7. The silicon glass tube 14 is inserted between lead wires 10a and 10b and the grommet 7 and at the position where the lead wires 10a and 10b are set closet to a rear bracket 12. In the first embodiment, the tube 14 surrounds the fixing part 11 of the lead wires. The silicone glass tube is fitted on the lead wires 10a and 10b before the latter are connected to the brushes 2a and 2a or the terminal 6.

The first embodiment is designed as described above. Hence, even if, because of an erroneous operation such as the insufficient return of the key switch of a motor vehicle, the starter motor is operated for a long period of time whereby a part of the winding is short-circuited, so that a large current flows to heat the lead wires thereby to carbonize the grommet 7, the expansion of the trouble with the motor is prevented. That is, the lead wires 10a and 10b and the rear bracket 12 are maintained electrically insulated from each other by the silicone glass tube 14 high both in heat resistance and in insulating property; that is, no leakage of current occurs between the lead wires 10a and 10b and the rear bracket 12. That is, a leakage current circuit which is formed by the lead wires 10a and 10b, the grommet 7, and the rear bracket 12 is cut off by the silicone glass tube 14. Hence, the carbonization of the grommet is not progressed; that is, the "dead grounding phenomenon" is eliminated; i.e., the expansion of the trouble with the motor is prevented.

In the case of the silicone glass tubes, even if silicone varnish impregnated in the lead wires is dissolved by heat, the tube of glass fiber remains, and therefore the "dead grounding phenomenon" scarcely occurs. Thus, the use of the silicone glass tubes is advantageous in that the occurrence of the dead grounding phenomenon is positively prevented.

In the above-described embodiment (FIG. 1), the two lead wires are secured to each other at the fixing part; however, the invention is not limited thereto or thereby. That is, the grommet 7 may be fitted on the two leads wires which are not secured to each other.

Furthermore, the technical concept of the invention may be applied to the case where the number of lead wires is only one. In this case, a brush is connected to one end of the lead wire, and the grommet is fitted on the lead wires, and the terminal is connected to the other end of the lead wire.

Moreover, instead of two lead wires, one lead wire may be employed in the following manner. The one lead wire is axially divided to have two branches. The two branches are connected to the brushes, and the grommet 7 is mounted on the body of the lead wire, and the terminal 6 is connected the end of the body of the lead wire.

In any one of the above-described three modifications, similarly as in the case of FIG. 1, the silicone glass tube 14 can be inserted between the lead wires and the grommet 7 and set at the position where the lead wires is closet to the rear bracket, providing the same effects as in the case of the first embodiment.

The silicone glass tube 14 may be extended in such a manner that both end portions are protruded from the grommet 7, to more effectively prevent the carbonization of the grommet 7.

In the above-described embodiment, the brushes 2a are connected to the ends of the lead wires; however, the same effect may be obtained in the case, too, where they are connected to internal conductors in the motor such as for instance the field windings.

Second Embodiment

Figure 2:
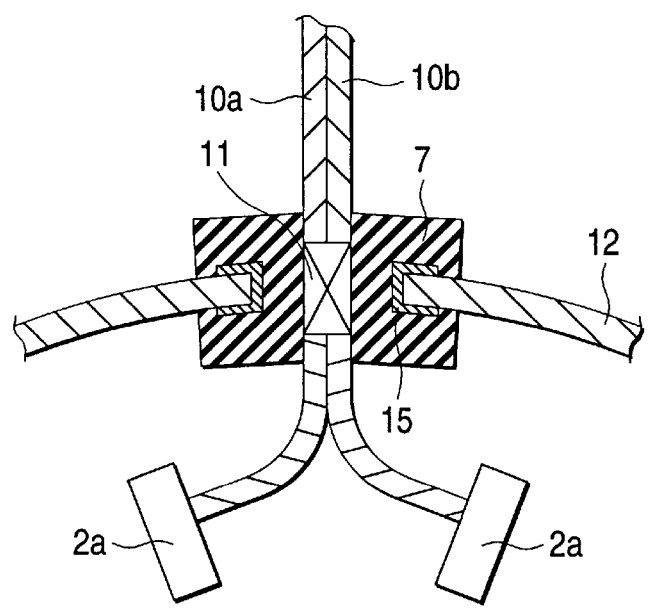
FIG. 2 is another example of the lead-wire leading device according to a second embodiment of the invention.

FIG. 2 is a diagram showing the arrangement of another example of the lead-wire leading device, which is a second embodiment of the invention. In FIG. 2, parts corresponding functionally to those already described with reference to FIGS. 4 and 5 are therefore designated by the same reference numerals or characters.

In FIG. 2, reference numeral 15 designates an insulating member which is made of alamide paper and U-shaped in section. The insulating member 15 is inserted between the grommet 7 and the rear bracket 12, and set at the position where the lead wires 10a and 10b are closet to the rear bracket 12. That is, the insulating member 15 is so set as to cover the whole edge of a grommet fitting hole formed in the rear bracket 12. In other words, the insulating member 15 is held between the grommet 7 and the rear bracket 12.

In general, the grommet 7 is made of polychloroprene rubber whose heat resistance temperature is about 130° C.

On the other hand, the heat resistance temperature of alamide paper is around 220° C. Hence, the alamide paper is higher in heat resistance than the grommet.

The second embodiment is designed as described above. Hence, even if, because of an erroneous operation such as the insufficient return of the key switch of a motor vehicle, the starter motor is operated for a long period of time, whereby a part of the internal winding of the motor is short-circuited, so that a large current flows to heat the lead wires thereby to carbonize the grommet 7; the expansion of the trouble with the motor is prevented. That is, the lead wires 10a and 10b and the rear bracket 12 are maintained electrically insulated from each other by the alamide paper 15 high in heat resistance which is located between the grommet 7 and the rear bracket 12, so that no leakage of current occurs between the lead wires 10a and 10b and the rear bracket 12. That is, a current leakage circuit which is formed by the lead wires 10a and 10b, the grommet 7, and the rear bracket 12 is cut off by the alamide paper 15. Hence, the carbonization of the grommet is not progressed, and the "dead grounding phenomenon" is eliminated; i.e., the expansion of the trouble with the motor is prevented.

The alamide paper is high in resistance at high temperature. This fact proves that the alamide paper is suitable as a material for cutting the leakage current circuit. Hence, the expansion of the trouble with the motor can be more positively prevented.

In the above-described embodiment (FIG. 2), the two lead wires are secured to each other at the fixing part; however, the invention is not limited thereto or thereby. That is, the grommet 7 may be fitted on the two leads wires which are not secured to each other.

Furthermore, the technical concept of the invention may be applied to the case where the number of lead wires is only one. In this case, a brush is connected to one end of the lead wire, and the grommet is fitted on the lead wires, and the terminal is connected to the other end of the lead wire.

Moreover, instead of two lead wires, one lead wire may be employed in the following manner. The one lead wire is axially divided to have two branches. The two branches are connected to the brushes, and the grommet 7 is mounted on the body of the lead wire, and the terminal 6 is connected the end of the body of the lead wire.

In any one of the above-described three modifications, similarly as in the case of FIG. 2, the alamide paper 15 can be inserted between the grommet 7 and the rear bracket 12, and set at the position where the lead wires are closet to the rear bracket, providing the same effects as in the case of the second embodiment.

The alamide paper 15 may be extended in such a manner that both end portions thereof are protruded from the grommet 7, to more effectively prevent the carbonization of the grommet 7.

In the above-described embodiment, the brushes 2a are connected to the ends of the lead wires; however, the same effect may be obtained in the case, too, where they are connected to internal conductors in the motor such as for instance the field windings.

Third Embodiment

Figure 3:
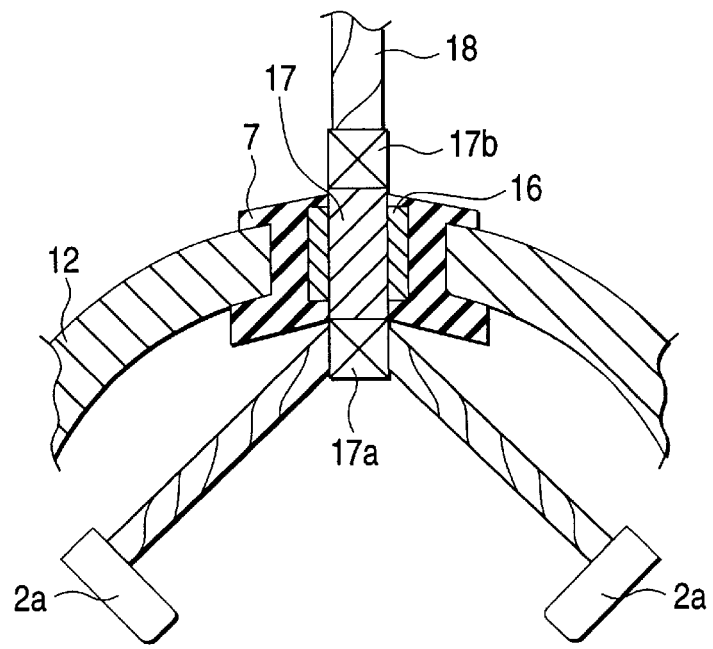
FIG. 3 is another example of the lead-wire leading device according to a third embodiment of the invention.

FIG. 3 is a diagram showing the arrangement of another example of the lead-wire leading device, which constitutes a third embodiment of the invention. In FIG. 3, parts corresponding functionally to those already described with reference to FIGS. 4 and 5 are therefore designated by the same reference numerals or characters.

In FIG. 3, reference numeral 17 designates a leading terminal made of a copper plate; and 16, an insulating member which is formed by winding a piece of silicone glass cloth adhesive tape on the leading terminal 17. The insulating member 16 is wound on the part of the leading terminal 17 at which the leading terminal 17 is closest to the rear bracket 12. The leading terminal 17, on which the insulating material 16 is wound, is integral with the grommet 7. Both end portions of the leading terminal 17 are welding portions 17a and 17b. The welding portion 17a is welded to the lead wires of the brushes 2a, and the welding portion 17b is welded to a lead wire 18.

The third embodiment is designed as described above. Hence, even if, because of an erroneous operation such as the insufficient return of the key switch of a motor vehicle, the starter motor is operated for a long period of time whereby a part of the internal winding of the motor is short-circuited, so that a large current flows to heat the leading terminal 17 thereby to carbonize the grommet 7; the expansion of the trouble with the motor is prevented. That is, the leading terminal 17 and the rear bracket 12 are maintained electrically insulated from each other by the silicone glass cloth adhesive tape, namely, the insulating member 16 high in heat resistance which is located between the grommet 7 and the rear bracket 12, so that no leakage of current occurs between the leading terminal 17 and the rear bracket 12.

That is, since the leading terminal 17, and the grommet 7 are made integral with the rear bracket 12, the carbonization of the grommet 7 is not progressed, and according the "dead grounding phenomenon" will never occurs; that is, the expansion of the trouble with the motor is prevented.

The silicone glass cloth adhesive tape 16 can be readily wound on the leading terminal 17, and fixed with adhesive agent. Hence, the silicone glass cloth adhesive tape 16 is not movable when the grommet is made integral with the tape 16. That is, the employment of the tape 16 enhances the workability.

In the above-described third embodiment, the leading terminal is made of a copper plate; however, it may be a lead wire.

As was described above, the grommet 7 and the leading terminal 17 are provided as one unit; however, the invention is not limited thereto or thereby. That is, the grommet 7 and the leading terminal 17 may be formed separately. In this case, after the silicone glass cloth adhesive tape 16 is wound on the leading terminal 17, the latter 17 is inserted into the grommet 7.

In the above-described embodiment, the brushes 2a are connected to the ends of the lead wires; however, the same effect may be obtained in the case, too, where they are connected to internal conductors in the motor such as for instance the field windings.

As was described above, the leakage current circuit which is formed by the lead wires, the grommet, and the motor frame when the motor operates abnormally, is cut off with the insulating member which is higher in heat resistance than the grommet. Hence, the carbonization of the grommet is not progressed, and the expansion of the trouble with the motor is prevented.

Furthermore, in the first embodiment, the insulating member is the silicone glass tube. The silicon glass tube is set between the lead wires and the grommet, to cut off the above-described leakage current circuit. Hence, the expansion of the trouble with the motor is more effectively prevented.

Moreover, in the second embodiment, the insulating member is the alamide paper. The alamide paper is set between the lead wires and the grommet, to cut off the aforementioned leakage current circuit. Hence, the expansion of the trouble with the motor is more positively prevented.

What is claimed is:

1. A lead-wire leading device in an electric motor, comprising:
   a lead wire having one end which is connected to a terminal, and the other end which is connected to an internal conductor in said electric motor;
   a grommet adapted to secure said lead wire to a motor frame; and
   an insulating member arranged between said lead wire and said motor frame, said insulating member being higher in heat resistance than said grommet.

2. A lead-wire leading device as claimed in claim 1, wherein said insulating member is a silicone glass tube arranged between said lead wire and said grommet.

3. A lead-wire leading device as claimed in claim 1, wherein said insulating member is an alamide paper arranged between said lead wire and said motor frame.

4. A lead-wire leading device as claimed in claim 1, wherein said insulating member is a piece of silicone glass adhesive tape wound on said lead wire.

5. A lead-wire leading device as claimed in claim 1, further comprising a second lead wire having one end which is connected to a terminal, and the other end which is connected to an internal conductor in said electric motor, said second lead wire is fixed with said lead wire to form a fixing portion; and
   wherein said insulating member surrounds the fixing portion.

6. A lead-wire leading device as claimed in claim 1, further comprising a leading terminal to which said lead wire is connected; and
   wherein said insulating member surrounds said leading terminal.

* * * * *